Oct. 1, 1968     H. A. WILLETT     3,403,796
CANE HANDLING APPARATUS
Filed Jan. 26, 1965     3 Sheets-Sheet 1
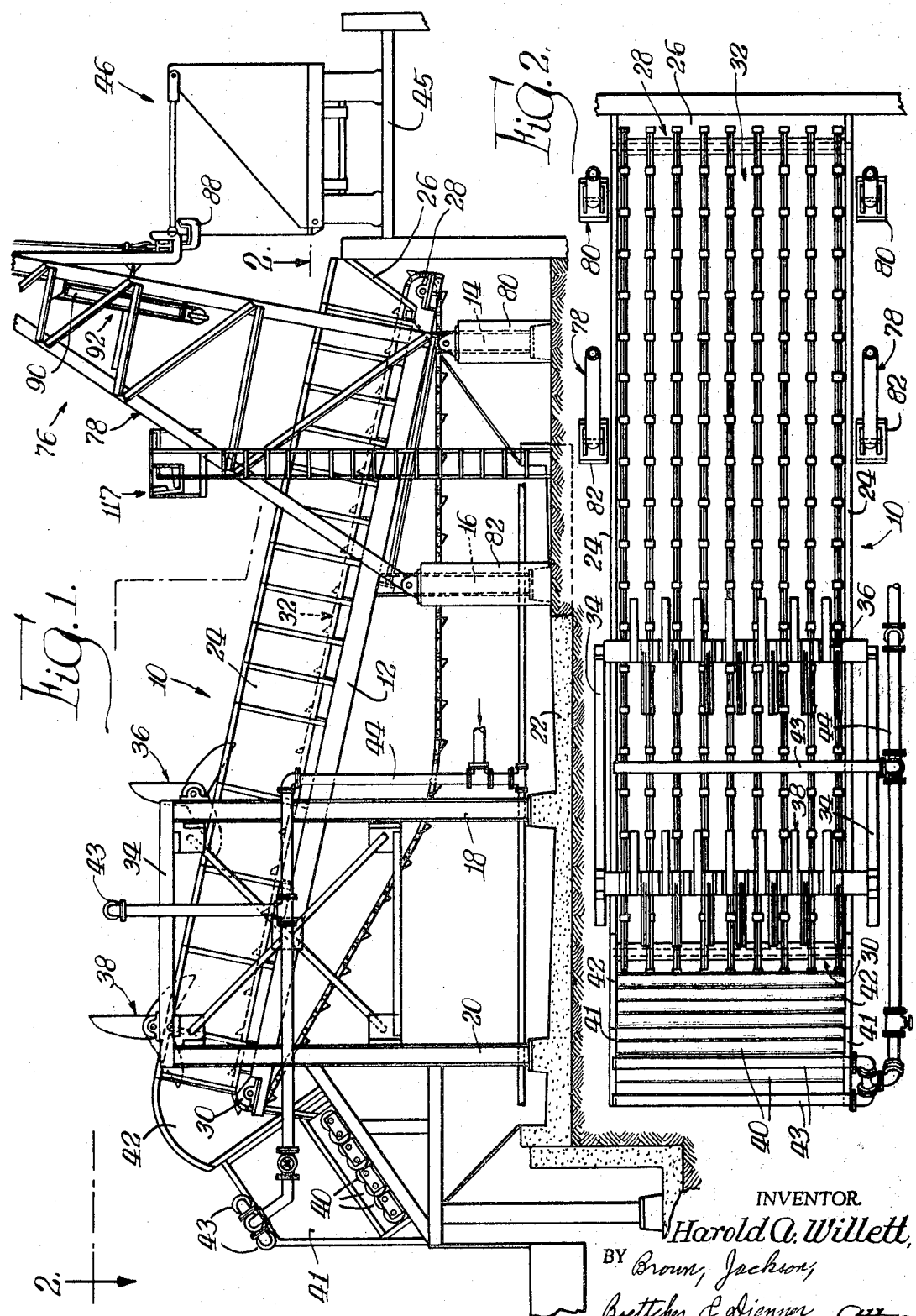
INVENTOR.
*Harold A. Willett,*
BY *Brown, Jackson,*
*Boettcher & Dienner*
*Attys.*

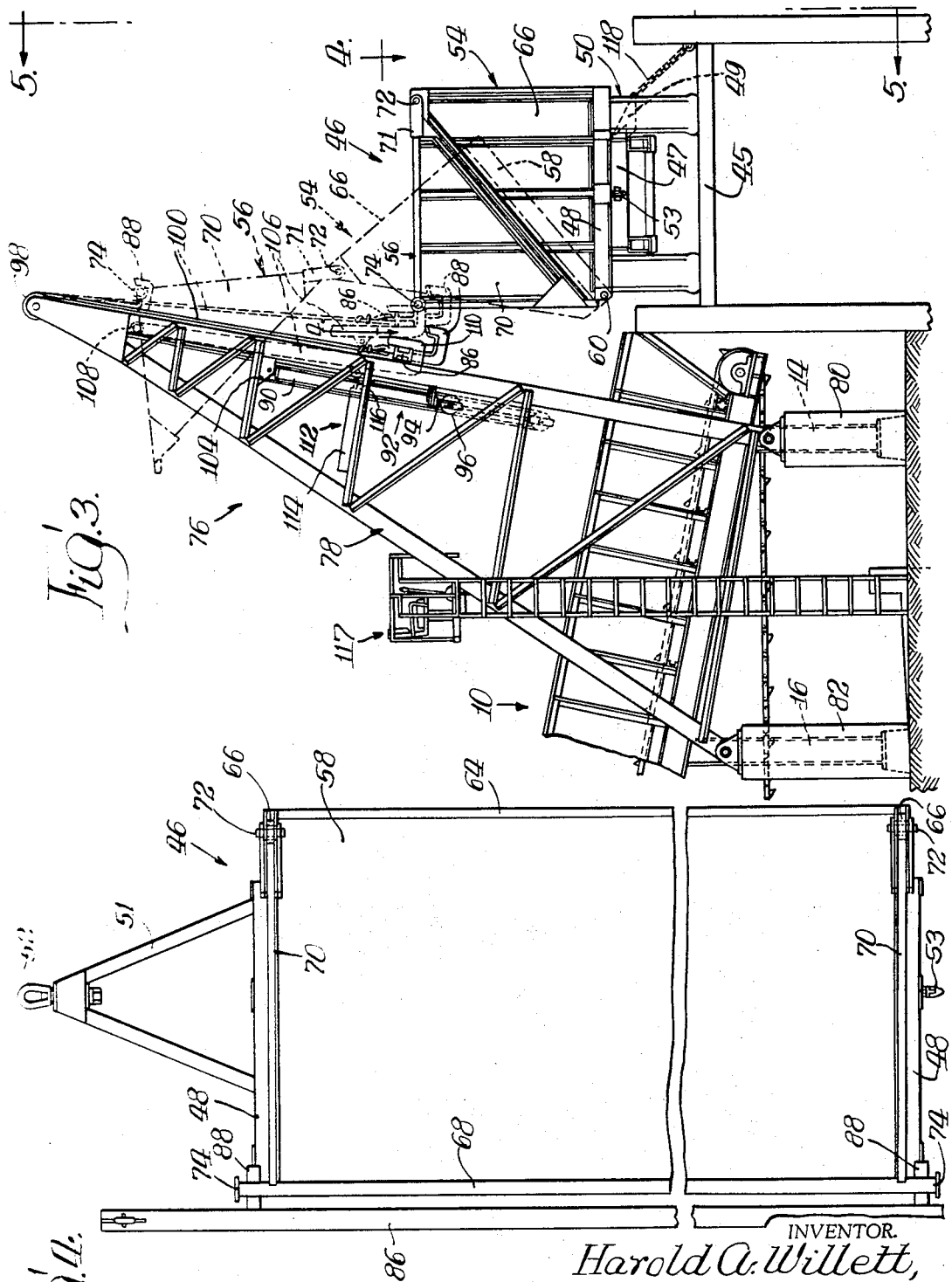

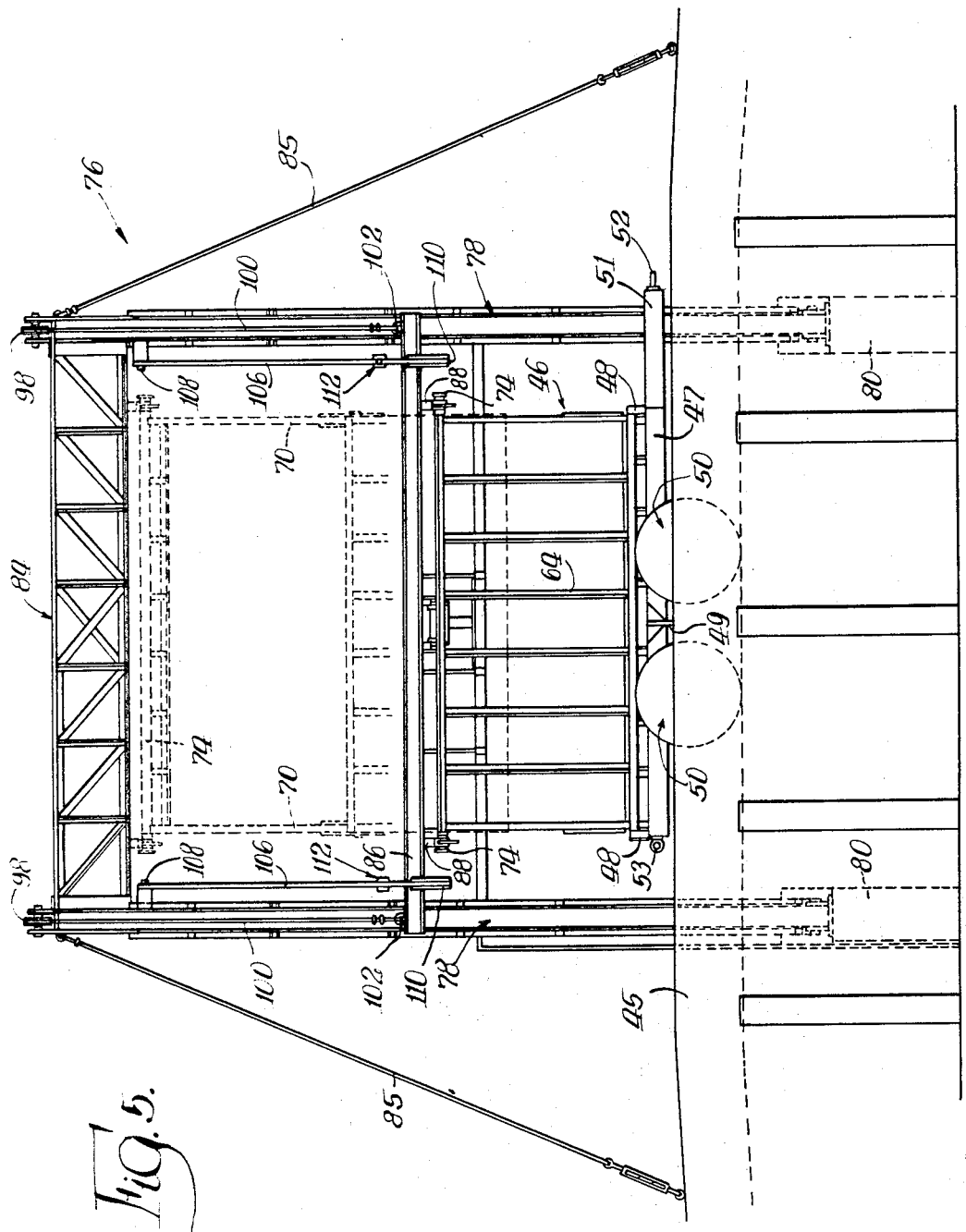

United States Patent Office 3,403,796
Patented Oct. 1, 1968

3,403,796
CANE HANDLING APPARATUS
Harold A. Willett, Thibodaux, La., assignor, by mesne assignments, to The Thomson Machinery Company, Inc., Thibodaux, La., a corporation of Delaware
Filed Jan. 26, 1965, Ser. No. 428,099
13 Claims. (Cl. 214—46)

My present invention relates to apparatus for handling sugar cane and the like. After sugar cane has been cut in the field, it is normally transported to a cane conveyor table where it is carried along, washed, leveled and fed to processing equipment of a sugar cane mill.

It is an object of my present invention to provide a novel and compact arrangement of a sugar cane conveyor table, a cane transporting wagon, and a boom assembly at the conveyor table for unloading the wagon, whereby the operations of unloading, receiving, leveling and mill feeding of sugar cane are conveniently consolidated.

It is another object of my present invention to provide a self-discharging wagon, in which sugar cane and the like may be transported to the cane conveyor table, and from which the sugar cane may be discharged in a simple fashion. The wagon of my present invention comprises a trailer including a main frame, and a sugar cane receiving body having two sections. The first body section is comprised of a floor, a side wall and portions of both end walls, and the second body section is comprised of a side wall and portions of both end walls. The first and second body sections are pivotally interconnected, and connecting means are provided for pivotally mounting the first body section to the trailer frame. The second body section is adapted to be pivoted upwardly and away from the first body section while the latter is pivoted upwardly and away from the trailer frame whereby the body floor is ultimately tilted and the side of the wagon is "opened" to permit the contents thereof to be discharged therefrom. By reason of this construction, complicated tilt leverage mechanisms, wagon hold down linkages, and chain slings or chain nets, of existing wagon constructions are completely avoided.

It is a further object of my present invention to provide apparatus, including a boom assembly which overlies the conveyor table adjacent the foot end thereof, for use in unloading sugar cane from the self-discharging wagon of my present invention described above. By arranging the boom assembly in overlying relationship with respect to the conveyor table, obstruction by a tower or crane assembly that would otherwise be located elsewhere in the cane yard, as in the case of prior art wagon unloading apparatus, is avoided. The unloading apparatus of my present invention includes suspended hook means that is adapted to be engaged with the second body section of the wagon for elevating the latter during the discharging operation. In a series of simple sequential steps, the hook means is arranged not only to be vertically movable but also to be swung toward and away from the boom assembly whereby to be moved into and out of position beneath the hook engageable portions of the wagon.

It is a still further object of my present invention to provide cane handling apparatus, as described, wherein the self discharging wagon is adapted to be positioned at the foot of the sugar cane conveyor table where it may then be opened by means of the hook means suspended from the boom assembly for effecting discharge of the cane sugar directly onto the conveyor table. Because the sugar cane is discharged directly onto the conveyor table, temporary storage of the sugar cane adjacent the cane table, and spillage and loss, are eliminated.

It is a feature of my present invention that the above described self discharging wagon may be used to store sugar cane; furthermore, upon release of the connecting means between the trailer and the first body section, both wagon body sections, and sugar cane therein, may be removed from the trailer frame and transferred to a truck or railroad car for long distance hauling.

Now in order to acquaint those skilled in the art with the manner of constructing and using cane handling apparatus in accordance with the principles of my present invention, I shall describe in connection with the accompanying drawings, a preferred embodiment of my invention.

In the drawings:

FIGURE 1 is a partial side elevational view of the cane handling apparatus of my present invention;

FIGURE 2 is essentially a plan view of the sugar cane conveyor table shown in FIGURE 1, taken substantially along the line 2—2 in FIGURE 1, looking in the direction indicated by the arrows;

FIGURE 3 is a side elevational view, on an enlarged scale, of a portion of the cane conveyor table of FIGURE 1, and of the self discharging wagon, and the wagon unloading apparatus, of my present invention;

FIGURE 4 is essentially a plan view, on a further enlarged scale, of the self discharging wagon of my present invention, taken substantially along the line 4—4 in FIGURE 3, looking in the direction indicated by the arrows; and FIGURE 5 is an end elevational view of my cane handling apparatus, taken substantially along the line 5—5 in FIGURE 3, looking in the direction indicated by the arrows.

Referring now to FIGURES 1 and 2, there is indicated generally by the reference numeral 10 a sugar cane conveyor table. The table 10 is comprised of framework including inclined laterally spaced side frame members 12, and pairs of laterally spaced vertical columns 14, 16, 18 and 20 supported on a suitable foundation 22. The table 10 further comprises reinforced side panel members 24 extending longitudinally of the side frame members 12, and a transverse end panel member 26 secured to and extending between the forward edges of the side panel members 24 at the right end of the table 10 as viewed in FIGURE 1. Rotatably mounted adjacent the ends of the side frame members 12 are transverse sprocket wheel assemblies 28 and 30 over which is trained an endless chain link conveyor belt assembly 32. The conveyor belt 32 is adapted to be selectively power rotated for transferring materials such as sugar cane and the like from the right end of the table 10, as viewed in FIGURE 1, to the left end thereof. During operation of the conveyor belt 32, the side panel members 24 and the transverse panel member 26 serve to define a trough-like structure to confine material on the belt 32.

The upper ends of the columns 18 and 20 at the respective sides of the table 10 are interconnected by head beams 34. Extending between and rotatably supported on the columns 18 adjacent the head beams 34 is a transverse leveler assembly 36, and extending between and rotatably supported on the head beams 34 adjacent the columns 20 is a transverse leveler assembly 38. The leveler assemblies 36 and 38 are each comprised of a plurality of sets of radially projecting blade members. While the conveyor belt 32 is carrying material therealong, the leveler assemblies 36 and 38 are rotated for generally aligning the sugar cane and averaging out the height of the sugar cane conveyed therealong. Sugar cane leaving the left end of the upper run of the conveyor belt 32 is discharged onto a plurality of rollers 40 the axes of which are arranged in a common downwardly inclined plane. Panels 41 are mounted at the sides of the rollers 40 and segment-like panels 42 serve to interconnect the respective panels 24 and 41. Thus, sugar cane discharged from the upper run of the conveyor belt 32 is confined laterally by means of the panels 41 and 42. Sugar cane leaving the rollers 40 is directed into processing equipment (not shown) of a sugar cane mill. Wash water is adapted to be sprayed on the sugar cane from transverse spray heads 43 having connection through suitable piping 44 with a source of water under pressure. An unloading platform or dock structure 45 is arranged at the foot of the conveyor table 10 for receiving wagons filled with cane sugar.

In accordance with the principles of my present invention, I provide a self-discharging wagon, indicated generally by the reference numeral 46, in which sugar cane and the like may be transported to the unloading platform 45 at the table 10, and from which the contents may be discharged directly onto the conveyor belt 32. The wagon 46, as best shown in FIGURES 3, 4 and 5, comprises a mobile trailer including a chassis or main frame 47 having transverse top braces 48 adjacent the opposite ends thereof, and a side flange 49 intermediate of the ends thereof. The frame 47, which is supported on a pair of axle and wheel assemblies 50, is provided at one end with a triangular extension 51 having an eye-bolt 52 or similar connector that serves as a hitch, and at the other end with a pintle hook 53 or similar connector. The axle and wheel assemblies 50 include four rubber tires that are appropriately spaced apart so that the wagon 46 may be readily moved between adjacent rows of sugar cane in the field. Also, by using four tires, the wagon exerts a low pressure on the supporting ground. When it is desired to move a series of wagons 46 from one location to another, they may be made up into a train. In such event, the pintle hook 53 of each wagon (except the last one) is connected with the eye-bolt 52 of the adjacent wagon, with a dolly (not shown) being connected to the eye-bolt 52 of the lead wagon.

The wagon 46 is further comprised of a body having two sections 54 and 56. The body section 54 includes a generally rectangular floor 58 pivotally mounted by means of pin members 60 to the transverse braces 48 on a common axis extending longitudinally of the wagon 46 at the discharge side thereof. Secured to and extending perpendicularly from the floor 58 opposite the discharge side thereof is a generally rectangular first side wall 64. The side wall 64 may be fabricated of bar and rod stock whereby to provide openings or breaks in the wall thereof. Generally triangular first end wall portions 66 are secured along their shorter sides to the floor 58 and the first side wall 64 at the opposite ends thereof. The body section 56 includes a generally rectangular second side wall 68 which is normally disposed perpendicularly to the floor 58 adjacent the discharge side of the wagon 46. The second side wall 68, like the first side wall 64, may be fabricated of rod and bar stock whereby to define a wall with openings or breaks therein. Generally triangular second end wall portions 70 are each secured along one of their shorter sides to the second side wall 68 at the opposite ends thereof.

As shown in solid lines in FIGURE 3, the long sides of each pair of the end wall portions 66 and 70 at the respective ends of the wagon 46 are normally disposed in mating relation whereby the end wall portions 66 and 70 together define complete wagon end walls. The ends of the second end wall portions 70 remote from the second side wall 68 are provided with flanges 71 which are pivotally mounted, as by means of pin members 72, to the first end wall portions 66 adjacent the upper edge of the first side wall 64. The pin members 72 have a common longitudinal axis that is spaced vertically above and normally laterally of the axis of the pin members 60. Secured to or formed integrally with the second side wall 68 adjacent the upper edge thereof are endwise projecting hook engageable extensions or portions 74. As will be presently described, the wagon section 56 is adapted to be pivoted upwardly and away from the section 54 while the section 54 is pivoted upwardly and away from the frame 47 whereby the wagon may be "opened" at the side to permit the contents thereof to be discharged therefrom. It is to be further appreciated that the wagon 46 may be used to store sugar cane and that, upon withdrawal or release of the pin members 60, the wagon body sections 54 and 56, and sugar cane therein, may be removed from the frame 47 of the wagon trailer and transferred to a truck or railroad car for long distance hauling.

Referring now to FIGURES 2, 3 and 5, I shall describe the apparatus of my present invention for use in unloading cane sugar from the self-discharging wagon 46. The wagon unloading apparatus includes a boom assembly, indicated generally by the reference numeral 76, which overlies the conveyor table 10 adjacent the foot end thereof. The boom assembly 70 is comprised of a pair of laterally spaced generally triangular vertical trusses 78 secured at their lower ends to posts 80 and 82 located at the sides of the conveyor table 10 and supported on the foundation 22. The foundation 22 thus serves as a common base for both the conveyor table 10 and the boom assembly 76. The side trusses 78 are suitably interconnected adjacent their upper ends by means of a bridge member 84 and may be further steadied by side guy wires 85. Extending transversely of the boom assembly 76 is a vertically movable beam 86 having a pair of laterally spaced hook members 88 secured thereto. Mounted on each side truss 78, as shown in FIGURE 3, is the cylinder 90 of a downwardly extending hydraulic piston and cylinder assembly 92. The piston rod 94 of each hydraulic assembly 92 has rotatably mounted at its outer end a pulley 96. Rotatably mounted about a common transverse axis at the upper ends of the side trusses 78 are pulleys 98. Trained over the respective pairs of pulleys 96 and 98 are cables 100. The cables 100 at their one ends are secured, as at 102, to the opposite ends of the transverse beam 86, and at their other ends are secured, as at 104, to the side trusses 78. When the piston rods 94 of the hydraulic assemblies 92 are distended, the transverse beam 86 is raised. Conversely, when the piston rods 94 of the hydraulic assembly 92 are retracted, the transverse beam 86 is lowered.

In order to facilitate movement of the hook members 88 into and out of position beneath the hook engageable wagon portions 74 during the unloading operation, I provide a pair of depending arm members 106 at the inboard sides of the side trusses 78. The arm members 106 at their upper ends are pivotally mounted, as at 108, to the side trusses 78, and at their lower ends are formed with beam receiving hook portions 110. Swinging movement of the arm members 106 about their pivotal mountings 108 is adapted to be effected by means of hydraulic piston and cylinder assemblies 112, the cylinders 114 of which are pivotally secured to the side trusses 78, and the piston rods 116 of which are pivotally mounted to the arm members 106 adjacent the lower ends thereof. A suitable hydraulic control system (not shown) is provided for actuating the hydraulic assemblies 92 and 112. An elevated operator's station or control platform 117 is preferably mounted at one side of the conveyor table 10 immediately rearwardly of the boom assembly 76.

In preparation for an unloading operation, the piston rods 94 of the hydraulic assemblies 92 and the piston rods 116 of the hydraulic assemblies 112 are fully retracted, whereupon the beam 86 rests in the beam receiving hook portions 110 and the arm members 106 are swung inwardly to the position shown in solid lines in FIGURE 3. Then, a wagon 46 filled with cane sugar is pulled or otherwise moved onto the unloading platform 45 adjacent the foot of the conveyor table 10. To steady the wagon 46 while being unloaded, a chain 118 may be connected between the platform 45 and the lateral flange 49 at the side of the wagon frame 47. Next, the piston rods 116 of the hydraulic assemblies 112 are distended for swinging the arm members 106 and transverse beam 86 outwardly and away from the boom assembly 76 to the position shown in dotted lines in FIGURE 3, whereby to locate the hook members 88 vertically below the hook engageable wagon portions 74. At this time, the hydraulic assemblies 92 are actuated for distending the piston rods 94 whereupon the beam 86 and the hook members 88 are elevated by the cables 100. After initial engagement has been effected between the hook members 88 and the wagon portions 74, further elevation of the hook members 88 causes the wagon body section 56 to pivot upwardly and away from the wagon body section 54, and successively causes the body section 54 to pivot upwardly and away from the wagon frame 47 whereby the floor 58 is ultimately tilted approximately to an angle of 30 degrees. During pivotal movement of the wagon sections to the position shown in dash-dot lines in FIGURE 3, the cane sugar within the wagon 46 is discharged by gravity from the side of the wagon facing the boom assembly 76 directly onto the conveyor belt 32 of the conveyor table 10. After the wagon 46 has been completely emptied, the hydraulic assemblies 92 are actuated for retracting the piston rods 94 whereupon the transverse beam 86 and hook members 88 are lowered thereby permitting the body sections 54 and 56 of the wagon 46 to pivot back to their normal disclosed position shown in solid lines in FIGURE 3. In the final stage of lowering, the transverse beam 86 is returned to rest in the hook portions 110 of the depending arm members 106 as shown in dotted lines in FIGURE 3, so as to permit the hook members 88 to clear the hook engageable wagon portions 74. Then, the hydraulic assemblies 112 are actuated for retracting the piston rods 116 in order to swing the arm members 106, the transverse beam 86 and the hook members 88 to the non-obstructing position shown in solid lines in FIGURE 3. After the chain 118 has been disconnected from the flange 49, the wagon 46 may be pulled or otherwise moved away from the unloading platform 45 and replaced by another wagon filled with sugar cane to be discharged onto the conveyor table 10.

While I have shown and described what I believe to be a preferred embodiment of my present invention, it will be understood by those skilled in the art that various rearrangements and modifications may be made therein without departing from the spirit and scope of my invention.

I claim:
1. In combination: a sugar cane conveyor table; a self-discharging wagon for transporting sugar cane to said conveyor table, said wagon comprising a frame, a body having two sections, one of said sections being comprised of a first side wall and a floor pivotally mounted to said frame, the other of said sections being comprised of a second side wall and end wall portions pivotally mounted to said one section, and hook engageable portions projecting from said other section; and wagon unloading apparatus comprising a boom assembly overlying said conveyor table adjacent one end thereof, and power operated hook means suspended from said boom assembly and engageable with said hook engageable wagon portions for elevating said wagon sections whereby sugar cane is discharged from the side of said wagon directly onto said conveyor table.

2. In combination: a sugar cane conveyor table; a self-discharging wagon for transporting sugar cane to said conveyor table, said wagon comprising a frame, a floor pivotally mounted to said frame about a longitudinal axis adjacent one side of said floor and said frame, a first side wall secured to said floor adjacent the other side thereof, first end wall portions secured to said floor and said first side wall at the ends thereof, a second side wall normally disposed adjacent said one side of said floor, second end wall portions secured to said second side wall at the ends thereof, each pair of said end wall portions at the respective ends of said wagon being normally disposed in mating relation, said ends of said second end wall portions remote from said second side wall being pivotally mounted to said first end wall portions about a longitudinal axis adjacent the upper edge of said first side wall, and hook engageable portions extending endwise from said second end wall portions adjacent the upper edge of said second side wall; and wagon unloading apparatus comprising a boom assembly overlying said conveyor table adjacent one end thereof, and power operated hook means suspended from said boom assembly and engageable with said hook engageable wagon portions for elevating said second wagon side wall and tilting said wagon floor whereby sugar cane is discharged from the side of said wagon directly onto said conveyor table.

3. In combination: a sugar cane conveyor table; a self-discharging wagon for transporting sugar cane to said conveyor table, said wagon comprising a frame, a body having two sections, one of said sections being comprised of a first side wall and a floor pivotally mounted to said frame, the other of said sections being comprised of a second side wall and end wall portions pivotally mounted to said one section, and hook engageable portions projecting from said other section; and wagon unloading apparatus comprising a boom assembly overlying said conveyor table adjacent one end thereof, a vertically movable transverse beam having a pair of laterally spaced hook members secured thereto, a pair of laterally spaced pulleys at the top of said boom assembly, cables trained over said pulleys and secured at their one ends to said transverse beam and at their other ends to said boom assembly, a pair of hydraulic piston and cylinder assemblies supported by said boom assembly and acting on said cables for effecting raising and lowering of said transverse beam, said transverse beam being freely suspended from said cables during raising and lowering thereof, a pair of laterally spaced depending arm members at their upper ends being pivotally mounted to said boom assembly and at their lower ends serving to receive said transverse beam when in lowered position, a pair of hydraulic piston and cylinder assemblies supported by said boom assembly for effecting swinging movement of said depending arm members and said transverse beam toward and away from said wagon whereby said hook members are moved into and out of position beneath said hook engageable wagon portions, and said hook members being elevatable and engageable with said hook engageable wagon portions for raising said wagon sections whereby sugar cane is discharged from the side of said wagon directly onto said conveyor table.

4. In combination: a self-discharging wagon comprising a frame, a floor pivotally mounted to said frame about a longitudinal axis adjacent one side of said floor and said frame, a first side wall secured to said floor adjacent the other side thereof, first end wall portions secured to said floor and said first side wall at the ends thereof, a second side wall normally disposed adjacent said one side of said floor, second end wall portions secured to said second side wall at the ends thereof, each pair of said wall portions at the respective ends of said wagon being normally disposed in mating relation, said ends of said second end wall portions remote from said second side wall being pivotally mounted to said first end wall portions about a longitudinal axis adjacent the upper edge of said first side wall, and hook engageable portions extending endwise from said second end wall portions adjacent the upper edge of said second side wall; and wagon unloading apparatus comprising a boom assembly, and power operated hook means suspended from said boom assembly and engageable with said hook engageable wagon portions for elevating said second wagon side wall and tilting said wagon floor whereby the contents of said wagon are discharged from the side of said wagon facing said boom assembly.

5. In combination: a self-discharging wagon comprising a frame, a body having two sections, one of said sections being comprised of a first side wall and a floor pivotally mounted to said frame, the other of said sections being comprised of a second side wall and end wall portions pivotally mounted to said one section, and hook engageable portions projecting from said other section; and wagon unloading apparatus comprising a boom assembly, a vertically movable transverse beam having a pair of laterally spaced hook members secured thereto, a pair of laterally spaced pulleys at the top of said boom assembly, cables trained over said pulleys and secured at their one ends to said transverse beam and at their other ends to said boom assembly, a pair of hydraulic piston and cylinder assemblies supported by said boom assembly and acting on said cables for effecting raising and lowering of said transverse beam, said transverse beam being freely suspended from said cables during raising and lowering thereof, a pair of laterally spaced depending arm members at their upper ends being pivotally mounted to said boom assembly and at their lower ends serving to receive said transverse beam when in lowered position, said arm members having a greater lateral spacing than said hook members, a pair of hydraulic piston and cylinder assemblies supported by said boom assembly for effecting swinging movement of said depending arm members and said transverse beam toward and away from said wagon whereby said hook members are moved into and out of position beneath said hook engageable wagon portions, and said hook members being elevatable and engageable with said hook engageable wagon portions for raising said wagon sections whereby the contents of said wagon are discharged from the side of said wagon facing said boom assembly.

6. In combination: a self-discharging wagon comprising a frame, a floor pivotally mounted to said frame about a longitudinal axis adjacent one side of said floor and said frame, a first side wall secured to said floor adjacent the other side thereof, first end wall portions secured to said floor and said first side wall at the ends thereof, a second side wall normally disposed adjacent said one side of said floor, second end wall portions secured to said second side wall at the ends thereof, each pair of said end wall portions at the respective ends of said wagon being normally disposed in mating relation, said ends of said second end wall portions remote from said second side wall being pivotally mounted to said first end wall portions about a longitudinal axis adjacent the upper edge of said first side wall, and hook engageable portions extending endwise from said second end wall portions adjacent the upper edge of said second side wall; and wagon unloading apparatus comprising a boom assembly, a vertically movable transverse beam having a pair of laterally spaced hook members secured thereto, a pair of laterally spaced pulleys at the top of said boom assembly, cables trained over said pulleys and secured at their one ends to said transverse beam and at their other ends to said boom assembly, a pair of hydraulic piston and cylinder assemblies supported by said boom assembly and acting on said cables for effecting raising and lowering of said transverse beam, said transverse beam being freely suspended from said cables during raising and lowering thereof, a pair of laterally spaced depending arm members at their upper ends being pivotally mounted to said boom assembly and at the lower ends serving to receive said transverse beam when in lowered position, said arm members having a greater lateral spacing than said hook members, a pair of hydraulic piston and cylinder assemblies supported by said boom assembly for effecting swinging movement of said depending arm members and said transverse beam toward and away from said wagon whereby said hook members are moved into and out of position beneath said hook engageable wagon portions, and said hook members being elevatable and engageable with said hook engageable wagon portions for raising said second wagon side wall and tilting said wagon floor whereby the contents of said wagon are discharged from the side of said wagon facing said boom assembly.

7. Apparatus for use in unloading material from a self-discharging wagon having hook engageable portions, comprising a boom assembly, a vertically movable transverse beam having hook members secured thereto, pulley means at the top of said boom assembly, cable means trained over said pulley means and secured at one end to said transverse beam, means supported by said boom assembly and acting on said cable means for effecting raising and lowering of said transverse beam, said transverse beam being freely suspended from said cable means during raising and lowering thereof, depending arm members at their upper ends being pivotally mounted to said boom assembly and at their lower ends serving to receive said transverse beam when in lowered position, and means supported by said boom assembly for effecting swinging movement of said depending arm members and said transverse beam toward and away from the wagon whereby said hook members are moved into and out of position beneath the hook engageable wagon portions.

8. Apparatus for use in unloading material from a self-discharging wagon having hook engageable portions, comprising a boom assembly, a vertically movable transverse beam having hook members secured thereto, pulley means at the top of said boom assembly, cable means trained over said pulley means and secured at one end to said transverse beam, hydraulic piston and cylinder assembly means supported by said boom assembly and acting on said cable means for effecting raising and lowering of said transverse beam, said transverse beam being freely suspended from said cable means during raising and lowering thereof, depending arm members at their upper ends being pivotally mounted to said boom assembly and at their lower ends serving to receive said transverse beam when in lowered position, and hydraulic piston and cylinder assembly means supported by said boom assembly for effecting swinging movement of said depending arm members and said transverse beam toward and away from the wagon whereby said hook members are moved into and out of position beneath the hook engageable wagon portions.

9. Apparatus for use in unloading material from a self-discharging wagon having hook engaging portions, comprising a boom assembly having a pair of laterally spaced vertical side trusses interconnected by a bridge member, a vertically movable transverse beam having a pair of laterally spaced hook members secured thereto, a pair of laterally spaced pulleys at the top of said boom assembly, cables trained over said pulleys and secured at their one ends to said transverse beam and at their other ends to said boom assembly, a pair of hydraulic piston and cylinder assemblies supported by said boom assembly and acting on said cables for effecting raising and lowering of said transverse beam, said transverse beam being freely suspended from said cables during raising and lowering thereof, a pair of laterally spaced depending arm members at their upper ends being pivotally mounted to said boom assembly and at their lower ends serving to receive said transverse beam when in lowered position, said arm members having a greater lateral spacing than said hook members, and a pair of hydraulic piston and cylinder assemblies supported by said boom assembly for effecting swinging movement of said depending arm members and said transverse beam toward and away from the wagon whereby said hook members are moved into and out of position beneath the hook engageable wagon portions.

10. A self-discharging wagon comprising a frame, a body having two pivotally interconnected sections one of which is pivotally mounted to said frame, one of said said sections having a floor and one side wall and portions of two end walls, and the other of said sections having one side wall and portions of two end walls.

11. A self-discharging wagon comprising a frame, a body having two sections, one of said sections having a floor and one side wall and portions of two end walls, said one section being pivotally mounted to said frame about a longitiudinal axis adjacent one side of said frame, the other of said sections having one side wall and portions of two end walls, and said other section being pivotally mounted to said one section about a longitudinal axis spaced vertically above and normally laterally of the axis of the pivotal mounting of said one section to said frame.

12. A self-discharging wagon comprising a frame, a floor pivotally mounted to said frame about a longitudinal axis adjacent one side of said floor and said frame, a first side wall secured to said floor adjacent the other side thereof, first end wall portions secured to said floor and said first side wall at the ends thereof, a second side wall normally disposed adjacent said one side of said floor, second end wall portions secured to said second side wall at the ends thereof, each pair of said end wall portions at the respective ends of said wagon being normally disposed in mating relation, said ends of said second end wall portions remote from said second side wall being pivotally mounted to said first end wall portions about a longitudinal axis adjacent the upper edge of said first side wall, and engageable means extending endwise from said second end wall portions.

13. A self-discharging wagon comprising a frame, a generally rectangular floor pivotally mounted to said frame about a longitudinal axis adjacent one side of said floor and said frame, a generally rectangular first side wall secured to and extending perpendicularly from said floor adjacent the other side thereof, generally triangular first end wall portions secured along their shorter sides to said floor and said first side wall at the opposite ends thereof, a generally rectangular second side wall normally disposed perpendicularly to said floor adjacent said one side thereof, generally triangular second end wall portions each secured along one of their shorter sides to said second side wall at the opposite ends thereof, the long sides of each pair of said end wall portions at the respective ends of said wagon being normally disposed in mating relation, said ends of said second end wall portions remote from said second side wall being pivotally mounted to said first end wall portions about a longitudinal axis adjacent the upper edge of said first side wall, and hook engageable portions extending endwise from said second end wall portions adjacent the upper edge of said second side wall.

References Cited
UNITED STATES PATENTS

| | | | |
|---|---|---|---|
| 2,936,913 | 5/1960 | Watt et al. | 214—64 X |
| 2,984,369 | 5/1961 | Johnston | 214—64 |
| 3,211,305 | 10/1965 | Davenport et al. | 214—64 X |
| 2,831,727 | 4/1958 | Wilkinson | 298—23 X |

ROBERT G. SHERIDAN, *Primary Examiner.*

GERALD M. FORLENZA, *Assistant Examiner.*